United States Patent Office 2,718,466
Patented Sept. 20, 1955

2,718,466

DIFFUSION-FAST COLOR-FORMERS IN A SILVER HALIDE EMULSION

Kurt Wolfson, Newton, N. J., assignor to Anken Chemical and Film Corporation, Newton, N. J., a corporation of New Jersey No Drawing. Application May 2, 1950, Serial No. 159,658

8 Claims. (Cl. 95—6)

This invention relates to photographic color-forming compounds containing coupling substances which are fast to diffusion.

The processes for producing photographic color images from a silver halide emulsion containing color forming substances require the latter to possess a number of physical and chemical properties besides the power to form coupling compounds. They must be non-diffusing in order to remain fixed in the colloid emulsion layer. They must have a certain affinity for water and yet possess a suitable degree of insolubility. They must have a uniform and sufficient color intensity. Because of these several requirements, which vary according to the particular photographic process employed, it has often been difficult to prepare color-forming compounds which adequately suit these requirements.

Several types of coupling substances have been proposed with the object of making these color formers immobile in the conventional gelatin silver salt layers for single or multilayer films used in color photography. It has been proposed to incorporate into the coupling molecule, long aliphatic chains of at least nine carbon atoms. Another proposal involves the use of sulfoneamide linkages to produce large coupling molecules. Other proposals involve the combining of polymers or polymerizable substances together with the coupler to form large molecules. These methods of producing large coupling molecules require difficult synthesis procedures resulting in poor yields and often insufficiently pure products. The polymer type of coupling compound has the further disadvantage of non-uniform distribution of the coupling function within the polymer molecules which results in a varying intensity of the dyes obtained in the subsequent developing process.

The present invention makes available a type of coupling compound produced by the step-wise condensation of amino compounds with halogen derivatives of triazine. Trichloro triazine and tribromo triazine are illustrative. By this method color-forming compounds can be prepared which combine the desirable properties of the several amino compounds which condense. The triazine nucleus is particularly suited for this multifunctional type of molecule since it can combine with three substituents in separate condensation stages. By careful control of the reaction temperature in each condensation stage, good yields of the intermediate reaction products can be obtained.

In the first stage, large size molecules are built up with di-functional amines to prevent diffusion. The water solubility of the compound is adjusted by means of carboxylic and sulfonic acid groups and their salts. Coupling positions are made available in each molecule to intensify the color obtainable with the compound.

The condensation may be carried out in the first stage with a diamine. Reacting 2 mols of trichloro triazine and 1 mol of an acid substituted aromatic diamine, and maintaining a reaction temperature of 0°–3° C., the following dichloro triazine derivative is obtained:

I

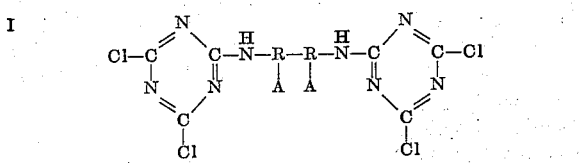

where R stands for a benzene or naphthalene ring or other aromatic or heterocyclic function, and A stands for a carboxylic acid or sulfonic acid substituent on the respective nucleus. A partial list of suitable amine compounds for this first stage includes:

Benzidene disulfonic acid
o,o'-Diamisidine-5,5' disulfonic acid
4,4' diamino stilbene-2,2' disulfonic acid
2,2' diamino 6,6' dibenzothiazolyl disulfonic acid The second stage condensation may be used to introduce the coupling component into the molecule. Immobile couplers may be prepared to give blue, yellow, or magenta dyes on development by the proper selection of the amine used in the condensation. For example, when two mols of an amino compound carrying a coupling function are reacted at 25°–40° C. with one mol of compound type I obtained in the first stage, the following is obtained:

II

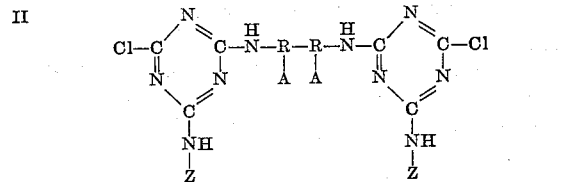

where Z is a group of at least six carbon atoms and may also contain a radical which will couple with the oxidation products of a primary aromatic amino color developer to form a colored image. For example, to obtain a yellow dye on development, an amino benzoyl aceto acetate could be used as the amine in the second stage condensation; in order to obtain a magenta dye on development, an amino-phenylmethylpyrazolone could be used; in order to obtain a blue dye on development, an amino naphthol could be used. A partial list of suitable amine compounds for the second stage condensation includes:

p-Amino-benzoyl-acetanilide
p-Amino-benzoyl-acetonitrile
3'-amino-1-phenyl-3-methyl-pyrazolone-5-4'-sulfonic acid
4-amino-salicylic acid
2-amino-1-naphthol-6-sulfonic acid
4''-amino-4'-phenoxy-1-phenyl-3-methyl-pyrazolone-5-3''-sulfonic acid The third stage condensation may serve to introduce additional coupling functions into the molecule and thus increase the dye intensity of the resulting product in the development process. The coupling function could be the same as the one introduced in the second stage condensation, or it could be a different coupling function. Preferably, however, the third stage condensation is used to introduce 2 mols of a substituted amine of at least six carbon atoms (and preferably ten to twelve, to give better substantive properties) by reaction at reflux temperature with one mol of compound type II to give

III

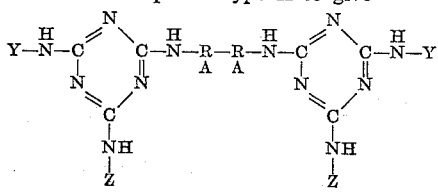

where Y is a group which will couple with the oxidation products of a primary aromatic amino color developer to form a colored image and may also contain a radical of at least six carbon atoms. A partial list of suitable amine compounds for this third stage condensation includes:

4-amino-biphenyl
2-amino-bispyridyl
Dicyclohexylamine

The following examples illustrate this invention.

*Example I.—4,4'-bis(4-amino-benzoylacetanilido)-6-(4-bisphenylamino)-s-triazine-2-yl-amino stilbene-2,2' disulfonic acid*

The structural formula is as follows:

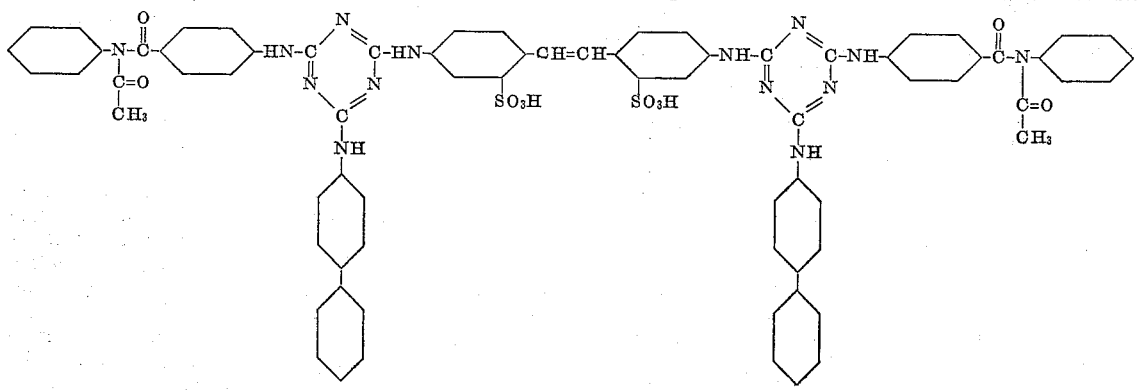

*First stage condensation.*—1/10 mol of 4,4' diamino-stilbene-2,2' disulfonic acid is neutralized with aqueous sodium carbonate to form the neutral sodium salt and the solution is brought to a volume of 500 cc. with water. To this solution 2/10 mol of trichloro-triazine dissolved in acetone is added dropwise with stirring and cooling so that the reaction temperature never exceeds 3° C. during the addition. The resulting suspension is held at room temperature for 15 minutes.

*Second stage condensation.*—An alcoholic solution of 2/10 mol of p-amino-benzoyl-acetanilide is added over a period of one hour to the reaction mixture obtained in the first stage. The hydrochloric acid developed by the reaction is neutralized by adding sodium bicarbonate in small portions. The temperature is maintained at 40° C. and after 4 hours at this temperature the condensation is complete.

*Third stage condensation.*—2/10 mol of 4-amino-biphenyl is added to the product of the second stage, and the mixture is boiled for one hour. After cooling, the reaction mixture is extracted with ether, and the product is salted out of the aqueous portion by the addition of sodium chloride. The precipitated compound is filtered by suction. It is then dissolved in 500 cc. of distilled water and dialyzed through an acetylcellulose membrane, until all by-products are removed. The solution is then concentrated on a steam-bath and the sodium salt is precipitated by the addition of alcohol. A yellowish powder results which is easily soluble in water and upon incorporation into an emulsion and developing with the known color developing agents gives a brilliant yellow azomethine dye image.

*Example II.—4,4' bis (4'-(3' amino-4' sulfo-1-phenyl-3-methylpyrozolone-5)-6-dicyclohexylamino-5-triazine-2-yl-amino) 2,2' dimethoxybenzidene-5,5' disulfonic acid*

The structural formula is as follows:

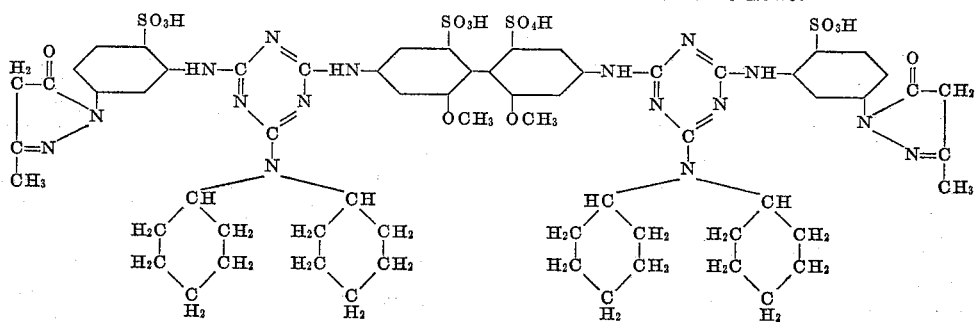

*First stage condensation.*—1/10 mol of O,O'-dianisidine 5,5' disulfonic acid is neutralized with sodium carbonate to the neutral sodium salt and brought to a volume of 500 cc. with water. The solution is cooled to 0° C. and to it is added slowly, with stirring, a pre-cooled solution of 2/10 mol trichloro-triazine in acetone. The reaction temperature is held between 0° and 3° C. After 30 minutes more at room temperature, the reaction is complete.

*Second stage condensation.*—2/10 mol of 3'-amino-1-phenyl-3-methyl-pyrazolone-5-4'-sulfonic acid is neutralized with sodium carbonate in water and the solution is added in several portions to the reaction mixture obtained in the first stage, each addition being followed by a portion of sodium bicarbonate approximately equivalent to the hydrochloric acid liberated by the reaction. The reaction temperature is held at 40° C. and after 4 hours at this temperature, the reaction is complete.

*Third stage condensation.*—2/10 mol of dicyclohexylamine is added to the product of the second stage and the mixture boiled for 2 hours. The final product is recovered and purified as described in Example I. It is a tan powder which is easily soluble in water and which gives a magenta color when used as a coupling compound in an emulsion.

*Example III.—4,4' bis (4-(4-amino-2-hydroxy-1-carboxy-phenyl)-6-dicyclohexylamino - 5 - triazine-2-yl-amino) stilbene 2,2- disulfonic acid*

The structural formula is as follows:

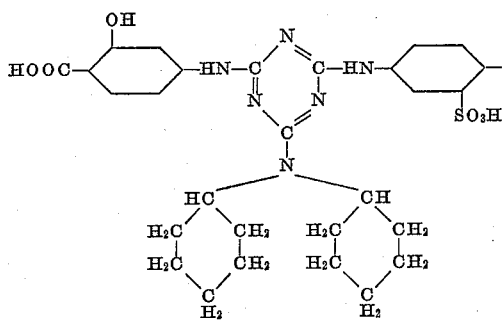

*First stage condensation.*—Same as in Example I.

*Second stage condensation.*—2/10 mol of 4-aminosalicylic acid is neutralized with sodium carbonate in water and the solution is added to the reaction mixture obtained in the first stage as described in Example II.

*Third stage condensation.*—Same as Example II. The final product is a light brown powder which gives a blue-green dye upon color development.

*Example IV.—4,4 bis (4,6 bis (4"-amino-4'-phenoxy-1-phenyl - 3 - methyl - pyrazolone - 5 - 3" - sulfonic acid) - triazine - 2 - yl - amino) stilbene - 2,2' - disulfonic acid*

The structural formula is as follows:

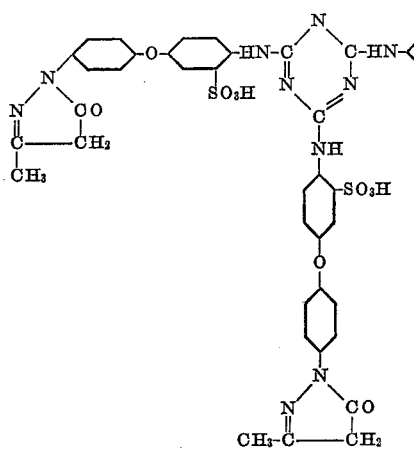

*First stage condensation.*—Same as Example I.

*Second and third stage condensation.*—4/10 mol of 4"-amino - 4' - phenoxy - 1 - phenyl - 3 - methyl - pyrazolone - 5 - 3" - sulfonic acid is neutralized with sodium carbonate and the neutral salt in aqueous solution is added to the product of the first stage. The mixture is boiled for 2 hours during which time 4/10 mol of sodium bicarbonate is added to neutralize the hydrochloric acid formed during the reaction. The final product is recovered and purified as described in Example I. It is a tan colored powder which gives a brilliant magenta dye image of good strength on development.

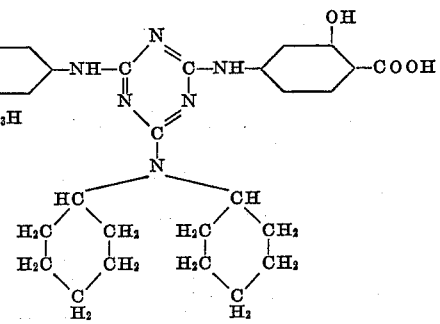

*Example V.—4,4' bis (5 - amino - 1 carboxy - phenyl - 2 azo - 4' (1 - phenyl - 3 - methyl - pyrazolone - 5) - 6 - (4 - amino - 2 - hydroxy - 1 - carboxy - phenyl) triazine 2 yl amino) stilbene 2,2' disulfonic acid*

The structural formula is as follows:

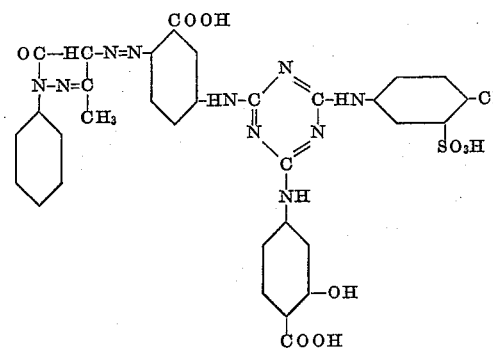

*First stage condensation.*—Same as Example I.

*Second stage condensation.*—2/10 mol of the sodium salt of 5-amino-benzoic acid-2-azo-4'-(1'-phenyl-3'-methyl-pyrazolone-5') in aqueous solution is added to the reaction mixture obtained in the first stage as described in Example II.

*Third stage condensation.*—2/10 mol of the sodium salt of 4-aminosalicylic acid is added to the product obtained

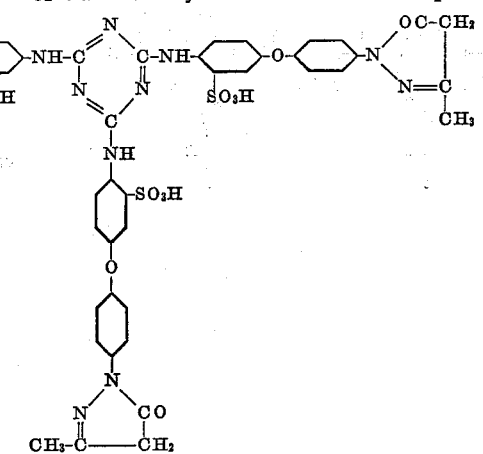

in the second stage. The mixture is boiled for 2 hours and sodium bicarbonate added to neutralize the liberated acid. The product is recovered and purified as described in Example I. It is an intense yellow, water soluble powder containing two different coupling centers in each molecule, and it produces a yellow color on development.

As many different embodiments of this invention may

I claim:
1. A silver halide emulsion for color photography containing a color forming component having the general formula:

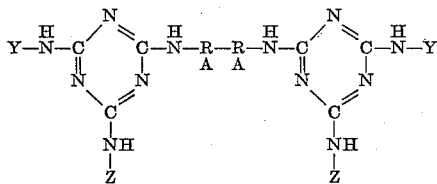

in which R stands for aryl, A stands for an acid group selected from the class consisting of carboxylic acids, sulfonic acids and their salts, Y stands for a group which will couple with the oxidation products of a primary aromatic amino color developer to form a colored image and may also contain a radical of at least six carbon atoms, and Z stands for a group of at least six carbon atoms and may also contain a radical which will couple with the oxidation products of a primary aromatic amino color developer to form a colored image.

2. A silver halide emulsion for color photography containing a color forming component having the general formula:

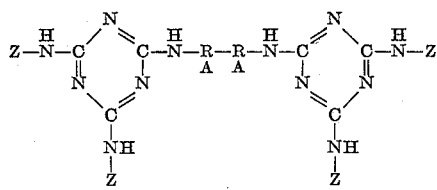

in which R stands for aryl, A stands for an acid group selected from the class consisting of carboxylic acids, sulfonic acids, and their salts, and Z is a radical of at least six carbon atoms which also contains a radical capable of coupling with the oxidation products of a primary aromatic amino developer to form a colored image.

3. A silver halide emulsion for color photography containing a color-forming component having the general formula:

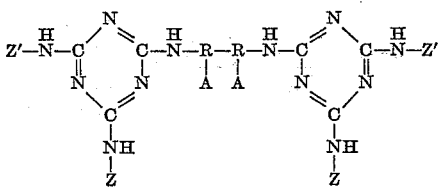

in which R stands for aryl, A stands for an acid group selected from the class consisting of carboxylic acids, sulfonic acids and their salts, Z is a radical of at least six carbon atoms which also contains a radical capable of coupling with the oxidation products of a primary aromatic amino developer to form a colored image, and Z′ is a group which will couple with the oxidation products of a primary aromatic amino color developer to form a colored image and may also contain a radical of at least six carbon atoms.

4. A silver halide emulsion for color photography containing a color-forming component consisting of: 4,4′-bis-(4 - amino - benzoylacetanilido) - 6 - (4 - bisphenylamino) - s - triazine - 2 - yl - aminostilbene - 2,2′ disulfonic acid.

5. A silver halide emulsion for color photography containing a color-forming component consisting of: 4,4′ bis-(4′ - (3′ - amino - 4′ - sulfo - 1 - phenyl - 3 - methylpyrazolone - 5) - 6 - dicyclohexylamino - 5 - triazine - 2-yl - amino)2,2′ - dimethoxybenzidine - 5,5′ - disulfonic acid.

6. A silver halide emulsion for color photography containing a color-forming component consisting of: 4,4′ bis-(4 - (4 - amino - 2 - hydroxy - 1 - carboxyphenyl) - 6-dicyclohexylamino - 5 - triazine - 2 - yl - amino) stilbene-2,2′ - disulfonic acid.

7. A silver halide emulsion for color photography containing a color-forming component consisting of: 4,4′ bis (4,6 bis (4″ - amino - 4′ - phenoxy - 1 - phenyl - 3 - methylpyrazolone - 5 - 3″ - sulfonic acid) - triazine - 2 - yl-amino) stilbene - 2,2′ - disulfonic acid.

8. A silver halide emulsion for color photography containing a color-forming component consisting of: 4,4′ bis (5 - amino - 1 - carboxyphenyl - 2 - azo - 4′ (1 - phenyl - 3-methyl-pyrazolone - 5) - 6 - (4 - amino - 2 - hydroxy - 1-carboxyphenyl) - triazine - 2 - yl - amino) stilbene - 2,2′-disulfonic acid.

References Cited in the file of this patent

UNITED STATES PATENTS

| | | |
|---|---|---|
| 1,625,533 | Fritzche et al. | Apr. 19, 1927 |
| 2,179,239 | Wilmanns et al. | Nov. 7, 1939 |
| 2,306,410 | Schinzel | Dec. 29, 1942 |
| 2,306,439 | Hentrich | Dec. 29, 1942 |
| 2,394,527 | Woodward | Feb. 5, 1946 |
| 2,418,747 | Bavley | Apr. 8, 1947 |
| 2,473,475 | Keller | June 14, 1949 |